United States Patent Office 3,315,645
Patented Apr. 25, 1967

3,315,645
HOT WATER BOILER
Sven Olof Linnersten, Jonkoping, Sweden, assignor to Aktiebolaget Gustavsbergs Fabriker, Gustavsberg, Sweden, a corporation of Sweden
Filed Mar. 8, 1965, Ser. No. 437,857
Claims priority, application Sweden, Mar. 9, 1964, 2,911/64; Mar. 19, 1964, 3,405/64
7 Claims. (Cl. 122—33)

In the expanding field of district heating plants the heating boilers are often concentrated in large heating stations and combined with plants for thermal power production. Prior-art hot water boilers suffer from a plurality of inconveniences. In view of the sensitiveness to depositions on the highly loaded heating surfaces of the furnace the conventional boilers are not suitable for direct heating of the unclean district heating water in the culvert main resulting in the necessity of providing a separate boiler water circuit with consequent long, expensive circulation conduits, circulation pumps and heat exchangers. Further, the separate circuit contains a great amount of water, this being uneconomic and resulting in a slow control of the boiler. For a satisfactory economy of the hot water boiler the heat exchangers have to be calculated for small differences in temperature between the boiler water and the main water and consequently have to be large and expensive. The hot water boilers which are most favourable from an economic point of view and, for this reason, are mostly used in practice and the furnaces of which are built up from stayed plate walls suffer from the serious inconvenience that no substantial generation of steam can be allowed at their heating surfaces.

The object of this invention is to provide a hot water boiler which fulfills all requirements made in a modern district heating station or thermal power plant.

In accordance with the invention a hot water boiler wherein the parts in contact with the flue gases are entirely or partly cooled by water and which comprises a self-circulation boiler water circuit separate from the remaining heat distribution system and in which said circulation is induced under the action of steam bubbles which are formed in the hot water boiler and which partly condense on or in a condensing heat exchanger placed inside or outside a steam dome and partly can be discharged to a place of consumption is characterized in that a heat exchanger is provided in a pipe descending from the dome to the boiler, said heat exchanger being adapted to control the steam generation in the boiler by cooling the returning water.

Figure 1:
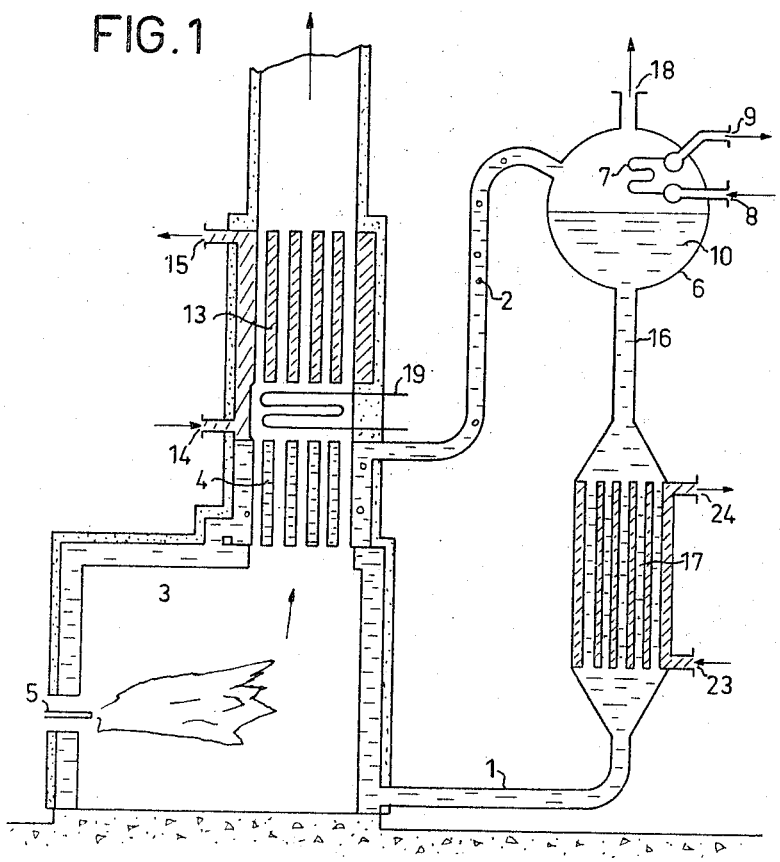
Figure 2:
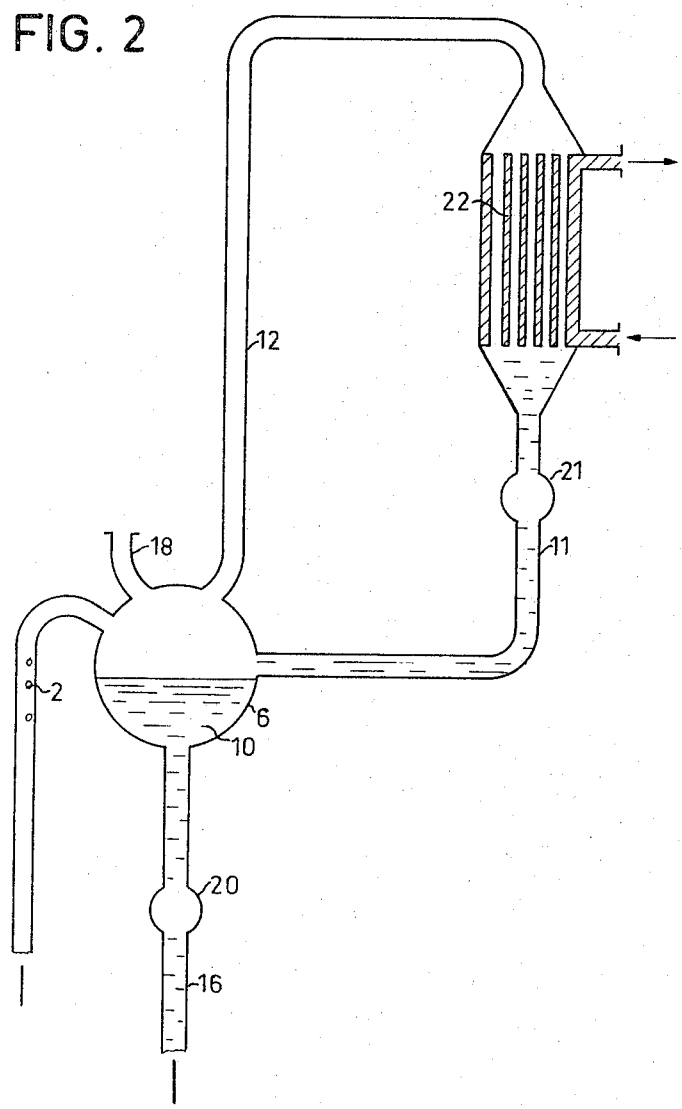
Figure 3:
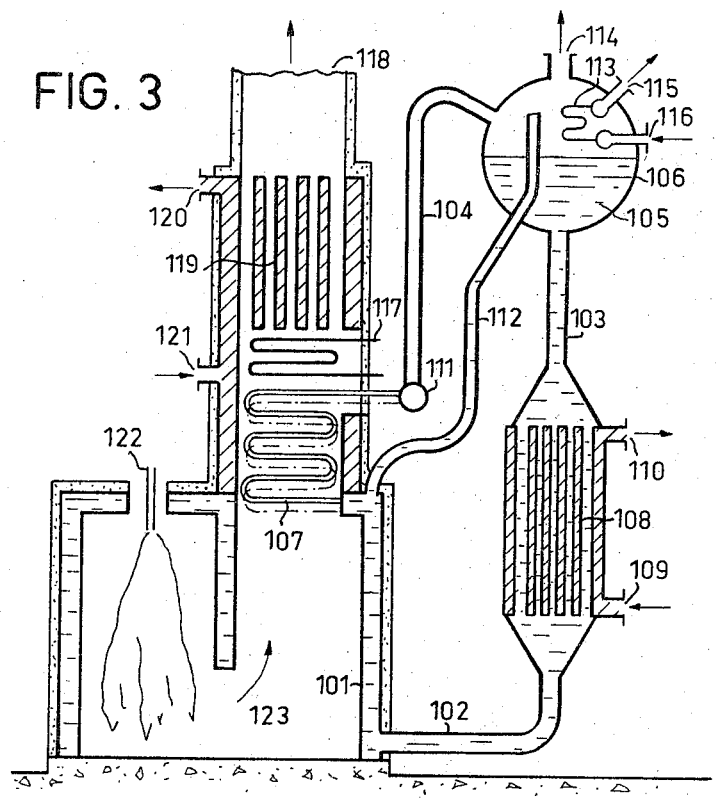
Figure 4:
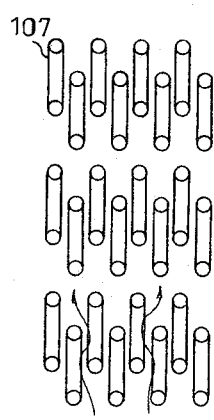
Figure 5:
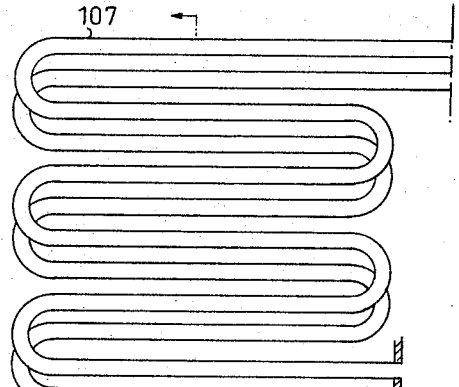

Embodiments of the invention are illustrated in the annexed drawings. FIG. 1 is a sectional elevation of a hot water boiler according to the invention. FIG. 2 is a modification of the arrangement shown in FIG. 1. FIG 3 illustrates a further embodiment of the invention. FIG. 4 is a diagrammatic cross-sectional view of the convection part of the boiler shown in FIG. 3, and FIG. 5 is an enlarged view of the tubes of the convection part.

Referring to FIG. 1, circulation in the boiler water circuit 1 is maintained by means of the lift induced by generated steam bubbles 2 which in accordance with the invention are suitably formed, controlled and utilized. The parts in contact with the flue gases are entirely or substantially cooled by water. The steam bubbles are generated in accordance with conventional steam boiler engineering due to the fact that the boiler pressure corresponds to the saturation pressure and due to simultaneous supply of heat and above all due to the fact that the pressure drops below the saturation pressure in utilizing the hydrostatic pressure difference as the water flows upwards. The furnace 3 and the convection part 4 of the hot water boiler consist of conventional, well-tried structures of stayed plate walls or, in order to obtain a higher pressure standard, entirely of a tube system or possibly of a combination of plate walls and tubes. The boiler is provided in the usual manner with a firing apparatus, such as an oil burner 5 illustrated in the drawing. In order to render possible said generation of steam bubbles for inducing a circulation, the hot water boiler is provided with a steam dome 6 having a free water surface where the generated steam bubbles break through. The steam thus generated is condensed on a condensing heat exchanger 7 having a secondary inlet 8 and a secondary outlet 9 for part of the culvert water of the district heating system. By maintaining the boiler water 10 at a high pressure and temperature level and due to the fact that the film coefficient of heat transfer in the condenser is extremely high the heating surface of the condensing heat exchanger can be very small as compared to the amount of heat exchanged. As shown in FIG. 2, the condensing heat exchanger 22 may be placed outside the dome 6 and connected to necessary descending pipes 11 for condensate and connecting pipes 12 for steam.

The boiler water section of the above described hot water boiler is adapted to operate at high temperatures in view of which it is impossible to cool the flue gases in the conventional manner by means of the boiler water to an economically justifiable temperature. However, within a certain, considerably great part of the convection zone of a hot water boiler the temperature of flue gases is low enough to prevent damage to the pressure vessel by depositions on the water side, this being in contrast to the conditions, for instance, in the furnace. This low temperature section of the convection part consists of a gas-water heat exchanger which previously had to be of large dimensions because of the fact that the difference in temperature between the boiler water and the flue gases at the end of the cooling zone was very small if a separate boiler water circuit was used. This low temperature section indicated at 13 in FIG. 1 is used without inconvenience in accordance with the present invention for direct heating of district heating water the temperature of which is considerably lower than the temperature of the boiler water and even lower than the temperature of the boiler water in conventional plants. In FIG. 1, the inlet and outlet for the district heating water are indicated at 14 and 15, respectively. The high temperature difference obtained in this manner is utilized for effective cooling of the flue gases down to the limit determined by corrosion or other economical conditions. The heat extracted in the low temperature section 13 is a great part of the total heat generated in the boiler and is in the manner described directly transmitted to the main water with the result that a separate external heat exchanger mentioned in the introductory part of this description can be entirely or partly avoided.

The steam condensed on the condensing heat exchanger 7 and the water which has been passed to the dome by the circulation induced by the steam bubbles are returned through descending pipes 16 to the heating surfaces of the hot water boiler. The circulation of water through the descending pipes can be very intensive. By providing a suitable heat exchanger 17 in the descending pipes it is possible completely to control the generation of steam in the hot water boiler. The temperature of the water returning to the heating surfaces of the hot water boiler is considerably lower than the saturation temperature at the prevailing pressure. This water has first to be heated to the saturation temperature before steam bubbles can be formed again. By suitable adaptation of the heat exchanger 17 the place where steam bubbles begin to be generated can be chosen at any desired location within the hot water boiler. From the above will be seen that the heat exchanger provided in the descending pipes constitutes the member by means of which a hot water boiler having stayed plate walls can be adapted for self-circulation by means of steam bubbles because the heat exchanger makes it possible to control the steam generation and to prevent detrimental steam generation at the highest loaded heating surfaces of the furnace. Consequently, by means of this novel combination of a hot water boiler having a limited steam generation ability with the heat exchanger it is possible to provide a system which fulfills the previously named requirements made on a hot water boiler for large heating stations.

Consequently, it is possible, by mutual adaptation of the heat exchangers 7, 13 and 17, within wide margins to adjust the steam pressure, the amount of steam consumption, boiler water circulation, total steam generation and the temperature of the flue gases. The described heat exchangers 7 and 13 in combination with the heat exchanger 17 act to exchange the total thermal effect produced in the boiler.

The steam discharged at 18 intermittently or continuously can be superheated to a reasonable temperature for further improving its quality. A superheater 19 of conventional type and preferably made of an alloy material is placed in the flue between the boiler water section and the low temperature section. At this place the temperature of the flue gases is beforehand adjusted such that a superheater of alloy material without difficulty can resist this temperature during long periods even if it is not cooled by steam.

Due to the invention it is possible considerably to reduce the boiler water volume as compared with other systems comprising a separate boiler water circuit with pumping circulation. This is an outstanding advantage regarding the control of the boiler. The hot water boiler can be supplemented of course by other details, such as by a condensate pump 21 provided in the return pipe 11 from the condensing heat exchanger 22 placed outside the dome independently of the free water surface in the dome, or by a circulation pump 20 provided in the descending pipes 16 as a precautionary measure in operation if the condensing heat exchanger has to be withdrawn from service for repair.

According to the embodiment illustrated in FIGS. 3 to 5 the convection part consists of small tubes which extend substantially at right angles to the direction of flow of the flue gases and in which steam is generated. The tubes are zigzag bent and the steam formed therein is passed together with the circulating water through ascending pipes into the dome which is placed above the convection part at a level sufficient for self-circulation and in which the generated steam is condensed on the condensing heat exchanger. From the dome the circulating water returns through descending pipes to the furnace of the hot water boiler from the top of which the convection part starts. Self-circulation occurs due to the difference in specific weight between the water in the descending pipes and the water-steam mixture in the ascending pipes. Since about one fourth to one third of the thermal output of the boiler can be transmitted in this convection part, there is no doubt that the formation of steam under all conditions of operation will start within this part. It is also possible to utilize the physical condition that within the range of temperature in the convection part a small change in temperature results in a great variation of the saturation pressure.

It is previously known to use small horizontal, zigzag bent tubes for substantially upward flow in self-circulation systems for steam boilers. However, such tubes have hitherto not been used in connection with hot water boilers.

The hot water boiler illustrated in FIG. 3 comprises a furnace 101 made up of stayed plates. By means of the firing apparatus 122 illustrated in the form of an oil burner fuel is burnt in the combustion space 123 from which the flue gases first pass through a convection part 107 and then through a superheater 117 and a further low temperature part 119 which, however, need not be connected to the boiler water circuit 102.

Similar to the previously described embodiment self-circulation is induced by the formation of steam in the boiler water circuit. In order to prevent generation of steam in the furance section, the heat exchanger 108 cools the circulating water returning through descending pipes 103 from the dome 105 to the hot water boiler. If the size of the heat exchanger is suitably chosen the saturation temperature will not be obtained until the water reaches the convection part 107.

The steam formed in the convection part 107 contributes to a strong circulation. By constructing the boiler water circuit for different hydrodynamic resistances and by determining the amount of steam generated by different sizes of the parts 107, 108 and 113 the dependence of the circulation on the load on the boiler can be given different characteristics. It is a well known fact in steam boiler engineering that in case of self-circulation the maximum circulation factor, that is, the ratio by weight of the amount of water circulating per unit of time to the amount of steam generated, is obtained at a very low load on the boiler. Consequently, the major part of the load range of the boiler has to operate with a circulation factor beyond the top point of the descending part of the load-depending characteristic curve of the circulation factor. In the present case, if for a hot water boiler the circulation factor would lie beyond its maximum value as is the case in a steam boiler, the heat exchanger 108 would have a negative characteristic with the result that the hot water boiler could not be rationally used in combination with a district heating plant. It is therefore important to have the entire range of operation of the hot water boiler located within the ascending part of the characteristic curve of the circulation factor. This can be easily attained in a hot water boiler according to the invention. By correct dimensioning of the heat exchanger 113 which exclusively determines the amount of steam generated in hot water boiler this steam generation can be limited within the whole range of load such as to secure the desired characteristic of circulation. This is possible only if the amount of steam is rather independent of the boiler output which in fact is the case with the present invention. In cooperation with the hot water boiler the convection tubes 107 can be as short as possible. As a result the resistance to flow in these tubes can be maintained at a low value. In the boiler about one tenth of the boiler output at full load can be converted into steam, this being sufficient for a satisfactory circulation. By suitable control of the heat exchanger 113 the steam generated can be discharged for consumption instead of being condensed.

During the generation of steam there occur often irregularities in the physical process. For instance, comparatively intensive, recurring but very short steam puffs are likely to occur in the convection part 107. As a result of such a puff a very small amount of steam may be suddenly propagated against the direction of flow and steam may enter into the water space of the hot water boiler at the place near the lower ends of the tubes 107. Such steam must be rapidly carried away and to this end there is provided a pipe 112 which without obstacle terminates above the free water surface 106 in the dome 105. This pipe also serves to carry away the extremely small amount of steam which perhaps is formed in the furnace section of the hot water boiler. Consequently, the pipe 112 is a safety pipe for the furnace. The tubes of the convection part 107 communicate close to the boiler with a collecting drum 111 from which ascending pipes 104 pass to the dome. The tubes of the convection part 107 may of course be straight instead of zigzag bent.

What I claim is:

1. A hot water boiler for remote heating systems comprising a combustion chamber having a water jacket and a firing apparatus, a flue connected to said combustion chamber, a steam generating convection part in said flue and connected to said water jacket, a steam dome having a free water surface, said steam dome being connected to said steam generating convection part by a pipe discharging above the free water surface therein, a condensing heat exchanger in contact with the steam in said steam dome, said condensing heat exchanger having an inlet and an outlet adapted to be connected to a remote heating system, a steam outlet in said steam dome, a downcomer connecting said steam dome with said water jacket, a second heat exchanger inserted in said downcomer, and water connections from said second heat exchanger adapted to be connected to a remote heating system.

2. A hot water boiler according to claim 1 wherein said steam generating convection part consists of small tubes arranged in parallel and starting from the top of said water jacket, said tubes being zigzag bent and comprising horizontal parts and being arranged for substantially upward flow.

3. A hot water boiler according to claim 1 comprising a pipe directly connecting said water jacket with the steam space in said steam dome.

4. A hot water boiler according to claim 1 comprising a low temperature section of the boiler in said flue and separated from the boiler water circuit in said jacket, said section being heated by flue gases leaving said steam generating convection part and adapted to be connected to a remote heating system.

5. A hot water boiler according to claim 4 comprising a superheater positioned in said flue between said steam generating convection part and said low temperature boiler section and connected to said steam dome.

6. A hot water boiler according to claim 1 wherein said condensing heat exchanger is located inside said steam dome.

7. A hot water boiler according to claim 1 wherein said condensing heat exchanger is located outside said steam dome.

References Cited by the Examiner

UNITED STATES PATENTS

| | | | |
|---|---|---|---|
| 2,823,650 | 2/1958 | Hedback et al. | 122—32 |
| 3,043,280 | 7/1962 | Alix | 122—459 |

FOREIGN PATENTS 304,300  12/1929  Great Britain.

CHARLES J. MYHRE, *Primary Examiner.*